US 6,689,500 B2

(12) United States Patent
Nelson (10) Patent No.: US 6,689,500 B2
(45) Date of Patent: Feb. 10, 2004

(54) COOLING A FUEL CELL STACK (75) Inventor: Milton H. Nelson, Saratoga Springs, NY (US)

(73) Assignee: Power Plug, Inc., Latham, NY (US)

( * ) Notice: Subject to any disclaimer, the term of this patent is extended or adjusted under 35 U.S.C. 154(b) by 75 days.

(21) Appl. No.: 09/821,598

(22) Filed: Mar. 29, 2001

(65) Prior Publication Data
US 2002/0142201 A1 Oct. 3, 2002

(51) Int. Cl.[7] .................................................. H01M 8/12
(52) U.S. Cl. ............................ 429/26; 429/13; 429/27
(58) Field of Search ............................... 429/13, 26, 27

(56) References Cited

U.S. PATENT DOCUMENTS

| 4,530,886 | A |   | 7/1985  | Sederquist             |
|-----------|---|---|---------|------------------------|
| 4,973,530 | A |   | 11/1990 | Vanderborgh et al.     |
| 5,131,238 | A | * | 7/1992  | Meckler ........ 62/271 |
| 5,200,278 | A |   | 4/1993  | Watkins et al.         |
| 5,252,410 | A | * | 10/1993 | Wilkinson et al. ... 429/33 |
| 5,366,818 | A |   | 11/1994 | Wilkinson et al.       |
| 5,382,478 | A |   | 1/1995  | Chow et al.            |
| 5,858,567 | A |   | 1/1999  | Spear, Jr. et al.      |
| 5,858,569 | A |   | 1/1999  | Meacher et al.         |
| 5,863,671 | A |   | 1/1999  | Spear, Jr. et al.      |
| 5,879,826 | A |   | 3/1999  | Lehman et al.          |
| 5,952,119 | A |   | 9/1999  | Wilson                 |
| 5,965,288 | A |   | 10/1999 | Okamoto                |
| 5,998,054 | A |   | 12/1999 | Jones et al.           |
| 6,015,633 | A |   | 1/2000  | Carlstrom, Jr. et al.  |
| 6,017,648 | A |   | 1/2000  | Jones                  |
| 6,051,331 | A |   | 4/2000  | Spear, Jr. et al.      |
| 6,057,051 | A |   | 5/2000  | Uchida et al.          |
| 6,066,408 | A |   | 5/2000  | Vitale et al.          |

* cited by examiner

Primary Examiner—Carol Chaney
Assistant Examiner—Dah Wei D Yuan
(74) Attorney, Agent, or Firm—Fish & Richardson P.C.

(57) ABSTRACT

A fuel cell system includes a first reactant intake manifold, a first reactant output manifold, a second reactant intake manifold, a second reactant output manifold, a cooling gas intake manifold, a cooling gas output manifold, a liquid intake manifold, fuel cells and a cooling elements distributed among the fuel cells. Each cooling element defines a coolant passage. During operation, a cooling gas flows from the cooling gas intake manifold into the cooling gas output manifold through the coolant passage. Each cooling element also includes a water injection path. During operation water from the liquid intake manifold is injected into the coolant passage to mix with the cooling gas passing therethrough.

6 Claims, 8 Drawing Sheets

COOLING A FUEL CELL STACK

TECHNICAL FIELD

This invention relates to cooling a fuel cell stack.

BACKGROUND

Fuel cells generate electrical energy by reacting two reactant gas streams with each other. One of the gases is referred to as an anode gas while the other is referred as a cathode gas. Certain fuel cells use a stream of gas that is rich in hydrogen as the anode gas and an air stream as the cathode gas. Each fuel cell includes an anode plate for introducing the hydrogen rich stream to the fuel cell and a cathode plate for introducing the air stream. A catalyst and a membrane, such as a proton exchange membrane, separate the anode plate and the cathode plate. When the fuel cell is in use, the catalyst splits hydrogen gas from the anode stream into protons and electrons. The protons pass through the membrane to react with oxygen from the cathode stream. The membrane does not allow electrons to pass through it, so the electrons cause the anode to become negatively charged while the protons cause the cathode to be positively charged, thereby generating a potential difference between the cathode and the anode. The potential difference can be used to provide electrical energy to a load. To maintain the ability of the membrane to allow protons to move through it, the membrane must be maintained in a moist state, for example, by humidifying the gases before they come into contact with the membrane.

Fuel cells generate electricity more efficiently when operated at an optimal operating temperature. The chemical reactions in the fuel cell typically generate heat. To maintain the fuel cell at the optimal temperature, a cooling system is used extract heat generated by a fuel cell. When fuel cells are operated in an environment where the temperature is below the optimal operating temperature, the reactant gases are preheated, for example to the optimal operating temperature, before they are introduced to the fuel cell.

Multiple fuel cells are typically stacked in series with the anode of one cell being electrically connected to the cathode of the next cell to generate larger potential differences between one end of the stack and the other end of the stack. The reactions in the fuel cells also generate heat. To maintain the fuel cell stack at a desired operating temperature, a cooling system is used to remove the generated heat from the fuel cell.

SUMMARY

In general, one aspect of the invention relates to a fuel cell system that includes fuel cells, and cooling elements distributed among the fuel cells. The fuel cell also includes a first reactant intake manifold, a first reactant output manifold, a second reactant intake manifold, a second reactant output manifold, a cooling gas intake manifold, a cooling gas output manifold, and a liquid intake manifold. Each fuel cell includes an anode element, a cathode element, and an associated electrolytic member sandwiched between the anode and cathode elements. The electrolytic member and the anode element define a first reactant flow field through which during operation a first reactant flows from the first reactant intake manifold across a first side of the associated electrolytic member and into the first reactant output manifold. The electrolytic member and the cathode element define a second reactant flow field through which, during operation, a second reactant flows from the second reactant intake manifold across a second side of the associated electrolytic member and into the second reactant output manifold.

Each cooling element defines a coolant passage through which, during operation, a cooling gas flows from the cooling gas intake manifold into the cooling gas output manifold. Each cooling element also includes a liquid injection path through which during operation liquid from the liquid intake manifold is injected into the coolant passage to mix with the cooling gas passing therethrough.

Embodiments of the invention may include one or more of the following features. A conduit connects the cooling gas output manifold to the second reactant intake manifold and directs the coolant gas from the coolant gas output manifold to the second reactant intake manifold.

The fuel cell stack includes a cathode plate and an anode plate. The cathode plate has a cathode reactant surface and a cathode cooling surface opposite the cathode reactant surface. The cathode reactant surface forms the cathode element of a first fuel cell. The anode plate has an anode reactant surface and an anode cooling surface opposite the anode reactant surface. The anode reactant surface forms the anode element of a second fuel cell adjacent to the first fuel cell. The anode cooling surface is positioned against the cathode cooling surface to form a cooling element of the fuel cell stack. The cathode cooling surface defines a cooling channel which when positioned against the anode cooling surface forms the coolant passage.

The cathode plate includes a passthrough opening from the cooling channel on the cathode cooling surface to the cathode reactant surface. A liquid channel connects the passthrough opening to the liquid intake manifold. During operation, liquid from the intake manifold flows through the liquid channel and is injected into the cooling channel through the passthrough opening.

In general, a second aspect of the invention relates to a method that includes introducing a coolant gas into a channel defined within a fuel cell stack, introducing water into the channel so that the water hydrates the coolant gas to produce a hydrated gas, allowing the hydrated gas to flow along the channel to an outlet port, and allowing the hydrated gas to escape from the outlet port. The hydrated gas absorbs heat from the stack as it flows along the channel and removes the absorbed heat from the stack when it flows from the outlet port.

Embodiments of the second aspect of the invention may include one or more of the following features. The hydrated gas is directed to a reactive surface of the fuel cell, where it is reacted to generate electricity. The reaction produces a hydrated exhaust stream. Water is condensed from the hydrated exhaust stream by transferring heat from the exhaust stream. The condensed water is introduces into the channel at a pressure between one and 5 psi. to hydrate the coolant gas. The heat is transferred from the hydrated exhaust system to a residential heating system that, for example, heats air or water.

In general, another aspect of the invention relates to a cooling plate for use in a fuel cell stack that includes a coolant inlet port, which during operation receives coolant gas, a coolant outlet port; and a cooling surface. The cooling surface has a cooling channel leading from the coolant inlet port to the coolant outlet port. The coolant gas flows from the coolant inlet port through the cooling channel and out of the coolant outlet port. The cooling surface also includes a water inlet port that is connected to the cooling channel.

Water is injected into the cooling channel during operation thereby hydrating the coolant gas to produce a hydrated gas. The hydrated gas absorbs heat from the first cooling plate as it flows along the cooling channel.

Embodiments of the invention may include one or more of the following features. The cooling plate includes a water manifold for providing water and a second surface opposite the cooling surface. The water inlet port runs from the cooling surface through the cooling plate to the second surface and the second surface has a water channel to direct water from the water manifold to the water inlet port. The second surface is a reactant surface that includes a reactive inlet port connected to the coolant outlet port to receive the hydrated gas, a reactive outlet port, and a reactive gas channel to allow the hydrated gas to flow from the reactive inlet port to the reactive outlet port. The reactive gas is reacted in the reactive gas channel to generate electricity.

In general, yet another aspect of the invention relates to a fuel cell system that includes a fuel cell stack, a heat recovery system and a conduit. During operation, the fuel cell stack generates electrical energy by reacting a first stream of reactant gas and a second stream of reactant gas. The fuel cell stack also produces a fuel cell exhaust stream that includes moisture. The heat recovery system is positioned to receive the fuel cell exhaust stream. During operation, the heat recovery system transfers heat from the fuel cell exhaust stream and causes the moisture contained within the exhaust stream to condense into water. The conduit is positioned to receive the condensed water. During operation, the conduit introducing the condensed water to the first stream of reactant gas in the fuel cell stack.

Embodiments of the invention may include one or more of the following features. The conduit provides enough condensed water to humidify the first stream or reactant gas. The fuel cell stack includes reactant channels and cooling channels. During operation, the first stream of reactant gas is reacted in the reactant channels. The first stream of reactant gas is flowed through the cooling channels before it is introduced to the reactant channels. An opening leads from the conduit to the cooling channels thereby allowing condensed water to flow from the conduit to the cooling channels.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
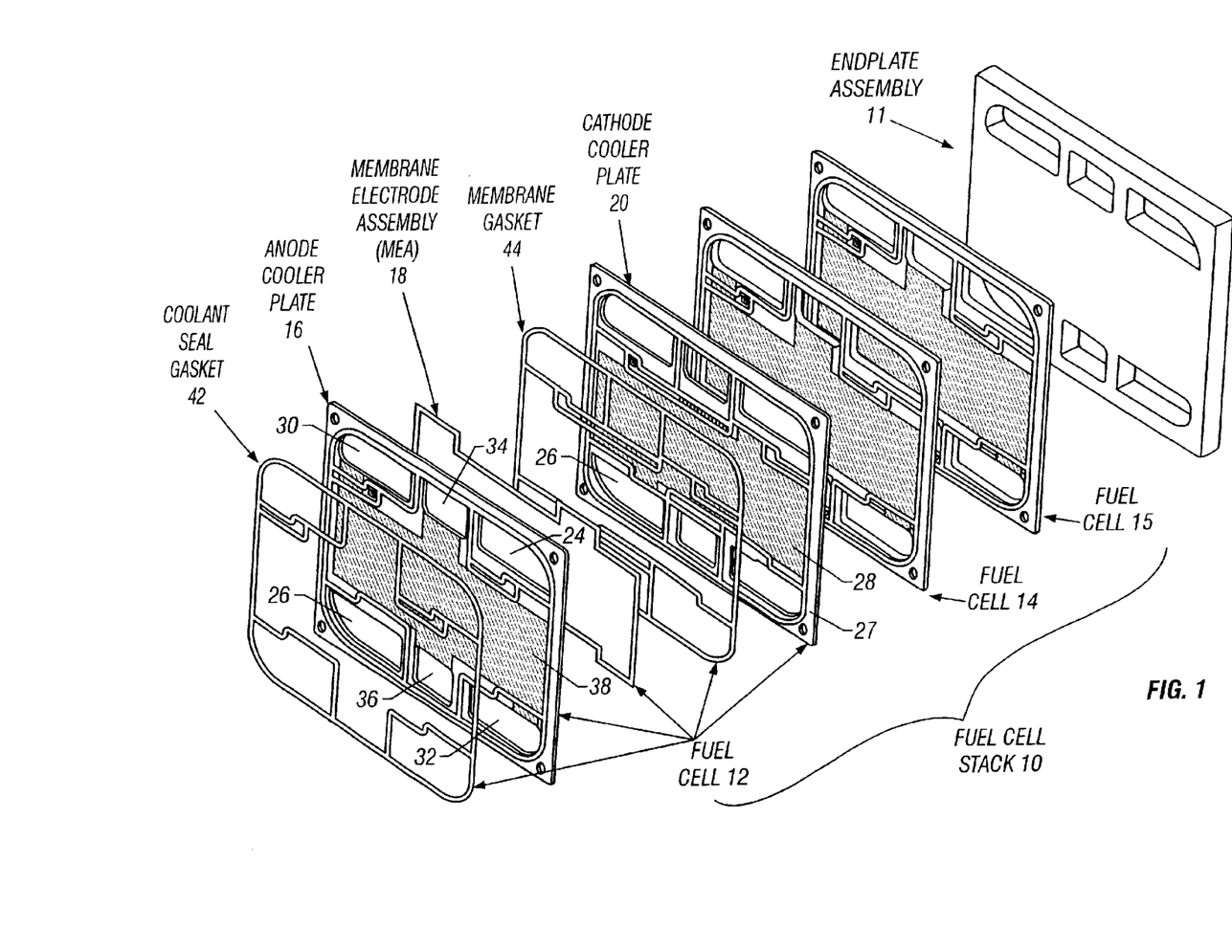
FIG. 1 shows an exploded view of a fuel cell stack including a cathode cooler plate according to the invention.

As shown in FIG. 1, a fuel cell stack 10 for reacting a hydrogen rich stream (anode gas) with an air stream (cathode gas) to generate electricity includes an end plate assembly 11 and multiple fuel cells 12, 14, 15 that are stacked one next to another. Although a typical fuel cell stack 10 includes many fuel cells, only three are shown in FIG. 1. Adjacent faces of the fuel cells 12, 14, and 15 are held against each other to maintain electrical contact between the adjacent faces, thereby allowing electricity to flow easily across the fuel cell stack 10 with minimal resistance. As will be described in greater detail below, the stack 10 is cooled by flowing an air stream through it. Water is introduced to the air stream within the fuel stack 10 to enhance the cooling effect of the air stream while humidifying the stream. The humidified stream flows within the stack 10 and absorbs heat from the stack, producing a warm, humidified air stream. The end plate assembly 11 directs the humidified air stream to the fuel cells 12, 14, 15 as the cathode gas air stream.

Each fuel cell 12 includes an anode cooler plate 16, a membrane electrode assembly (MEA) 18 and a cathode cooler plate 20. Each of the cathode cooler plate 20 and the anode cooler plate 16 has a cathode intake opening 24 running through it, which when aligned with similar openings in the other plates of the fuel cell stack 10 define a cathode intake manifold for introducing the cathode air stream to the fuel cell stack 10. Each of the cooler plates 16 and 20 also has a cathode outlet opening 26, which when aligned with corresponding openings in the other plates of the fuel cell stack 10 defines a cathode outlet manifold 26 to allow the cathode air stream to flow out of the fuel cell stack 10.

Figure 6A:
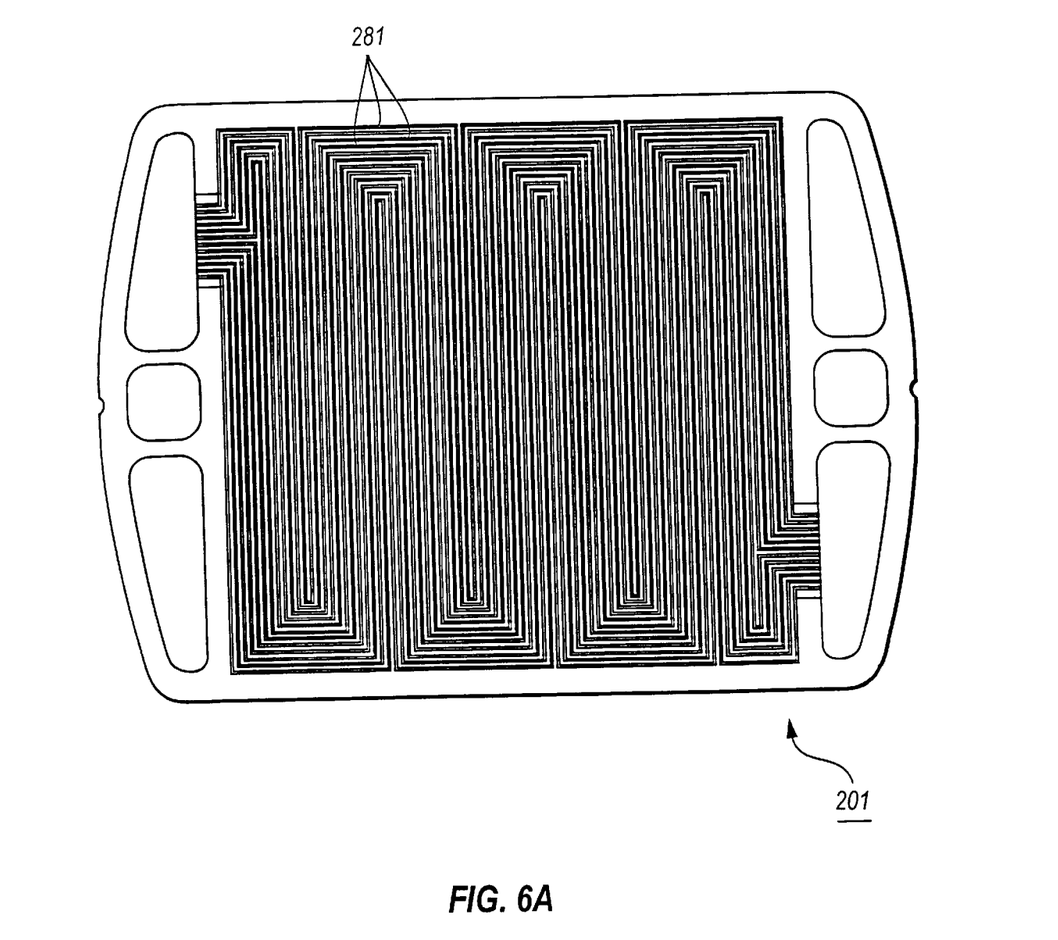
FIG. 6A, shows a reactant surface of a cathode cooler plate for a different design of a fuel cell stack.

Multiple serpentine cathode gas channels 28 (represented by the black area 28) formed on a reactant surface 27 of the cathode cooler plate 20 connect the intake opening 24 to the outlet opening 26. Due to the small scale used in FIG. 1, it is not possible to show the details of those channels in that figure. However, a clearer example of the serpentine nature of the channels is shown in FIG. 6A which presents a cathode plate 201 with serpentine channels 281 formed in its surface. The layout on the described embodiment of the present invention is similar.

During operation, cathode gas channels 28 allow air to flow from the cathode intake opening 24 to the cathode outlet opening 26. The channels 28 are open faced to expose the air to the membrane electrode assembly 18, thereby allowing oxygen contained within the air to react with protons from the membrane electrode assembly 18. The channels 28 wind back and forth over the surface of the cathode cooler plate 20 to increase the exposure of the air to the cathode cooler plate. Cathode gas channels 28 are described in greater detail with reference to FIG. 4 below.

Figure 6B:
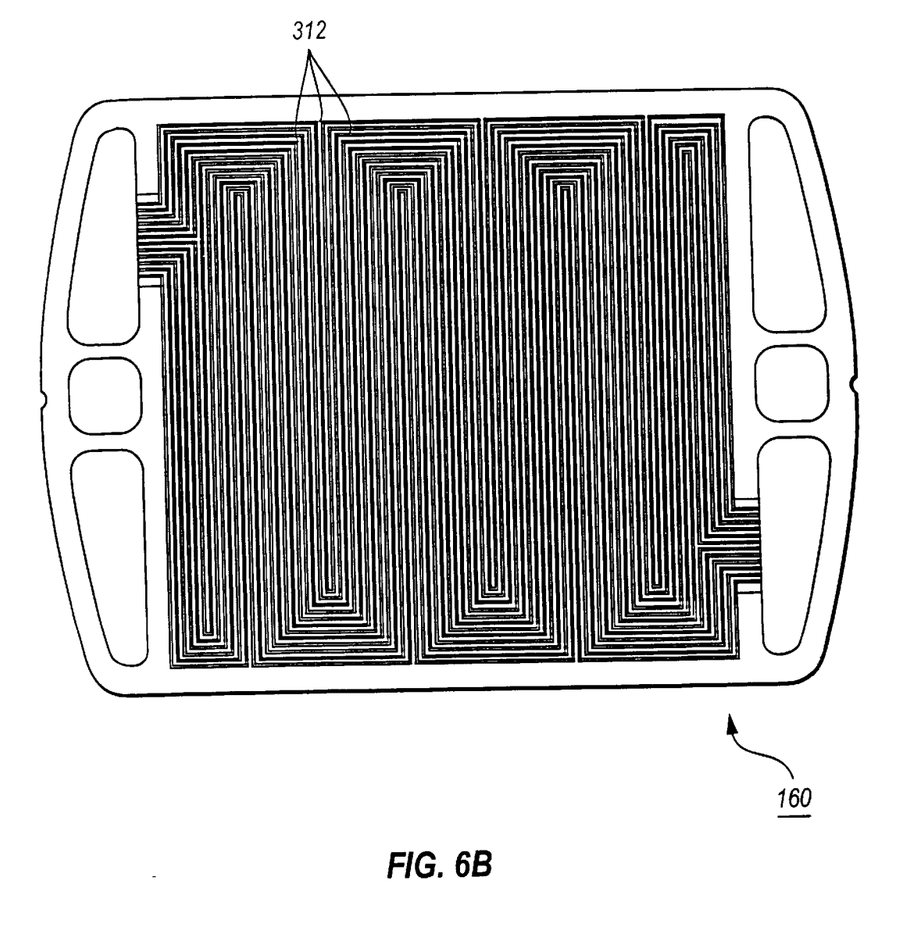
FIG. 6B, shows a reactant surface of an cathode cooler plate for the different design.

Each of the anode cooler plate 16 and the cathode cooler plate 20 has an anode intake opening 30 which when aligned with similar openings in the other plates of the stack 10 form an anode intake manifold for introducing the hydrogen rich stream to the fuel cell stack 10. Cooler plates 16 and 20 also have an anode outlet opening 32 which when aligned with similar openings in the other plates of the stack 10 form an anode outlet manifold to allow exhaust anode gases from the fuel cell to flow out of the fuel cell stack 10. Multiple serpentine anode gas channels formed on the surface of the anode cooler plate 16 connect the anode intake opening 30 to the anode outlet opening 32 to allow the hydrogen rich gas stream to flow from the anode intake opening 30 to the anode outlet opening 32. Again, due to small scale of the drawings these channels are represented by the black area in the figure. An illustrative example of the design and layout of such serpentine anode gas channels is shown by the anode gas channels 312 of a different anode cooler plate 160 shown in FIG. 6B. Like the cathode gas channels, the anode gas channels are open-faced to expose the hydrogen-rich stream to the membrane electrolyte assembly 18. The anode gas channels move back and forth over the surface of the anode cooler plate to increase the exposure of the gas to the membrane electrolyte assembly 18.

A catalyst contained within the membrane electrolyte assembly separates hydrogen gas contained within the hydrogen-rich stream into protons and electrons. A membrane in the membrane electrolyte assembly 18 allows the protons to flow to the cathode cooler plate side of the membrane while preventing the electrons from flowing across the membrane. The excess of electrons on the anode cooler plate 16 cause it to be negatively charged, and the excess protons on the cathode cooler plate 20 cause the cathode cooler plate 20 to be positively charged. Thus a potential difference is generated between the positively charged cathode cooler plate 20 and the anode cooler plate 16. Each cell 12, 14, 15 contributes a potential difference resulting in a higher voltage across terminals (not shown) at either end of the fuel cell stack. The terminals provide electrical energy to a load based on the potential difference. The membrane must remain moist and is maintained at a target temperature to operate optimally.

Each of the anode cooler plate 16 and the cathode cooler plate 20 has a coolant intake opening 34, which when aligned with similar openings in the other plates of the fuel cell stack 10 form a coolant intake manifold for introducing a coolant air stream into fuel cell stack 10. Each of the plates 16 and 20 also has a coolant outlet opening 36, which when aligned with similar openings in the other plates of the fuel cell forms a coolant outlet manifold. Multiple serpentine coolant channels 38 formed on the anode cooler plate 16 and the cathode cooler plate 20 connect the coolant intake opening 34 to the coolant outlet opening 36. Again, due to small scale of the drawings these channels are represented by the black area 38 in the figure. An illustrative example of the design and layout of such serpentine anode gas channels is shown by the coolant channels 380 of a different cathode plate 200 shown in FIG. 6C. The coolant channels 38 of the cathode cooler plate 20 are described in greater detail below with reference to FIG. 3.

The coolant channels 38 of the anode cooler plate and the coolant channels of the cathode cooler plate of an adjacent fuel cell are matched so that the coolant channels form conduits when the fuel cells are pressed together in the fuel cell stack. The conduits provide a path through which cooling air is flowed from the coolant inlet opening 34 to the coolant outlet opening 36 of the coolant plates during operation. As will be described in greater detail below with reference to FIG. 3, water inlet ports introduce water to the coolant conduits, thereby humidifying the coolant air and enhancing the cooling effect of the coolant air. As the humidified coolant air flows through the channels 38, it absorbs heat from the coolant plates. The warm, humidified coolant air flows out of the coolant outlet manifold 36, taking the absorbed heat out of the fuel cell stack 10 and cooling the stack.

A coolant gasket 42 and a membrane gasket 44 keep gases from leaking from the manifolds 24, 26, 30, 32, 34, 36 and out of the fuel cell stack 10.

Figure 2:
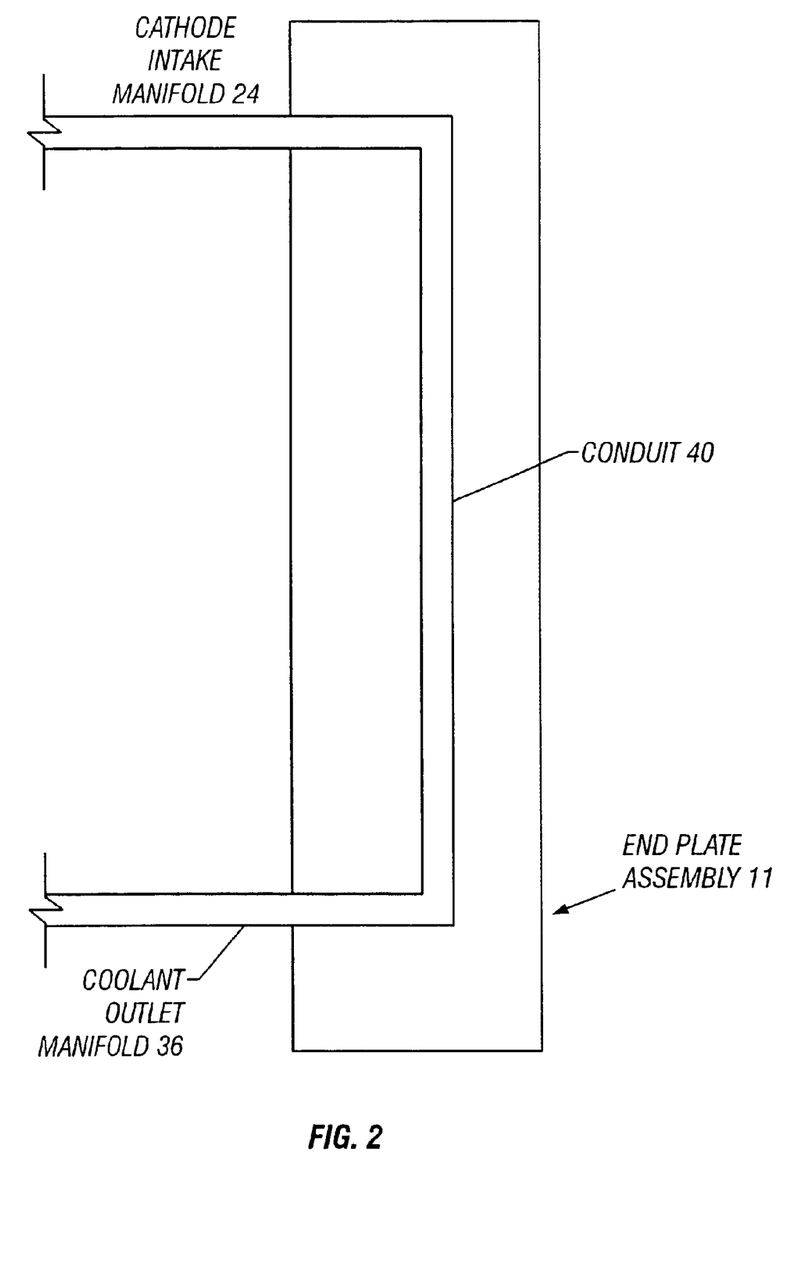
FIG. 2 is a cross-sectional view of the end plate assembly for use with the fuel cell stack of FIG. 1.

As shown in FIG. 2, the end plate assembly 11 directs the warm humidified coolant air from the coolant outlet manifold to the cathode intake manifold of the fuel cell stack. The directed air is used as the cathode gas in the fuel cells. The end plate assembly 11 receives the warm, humidified coolant air from the coolant outlet manifold 36. A conduit 40 in the end plate assembly 11 directs the coolant air from the coolant outlet manifold 36 to the cathode intake manifold 24 to provide warm, humidified cathode air to the fuel cell stack 10 as the cathode gas. Since the coolant air is warm and humidified, it does not dry out or cool the membrane electrode assembly 18.

Figure 3:
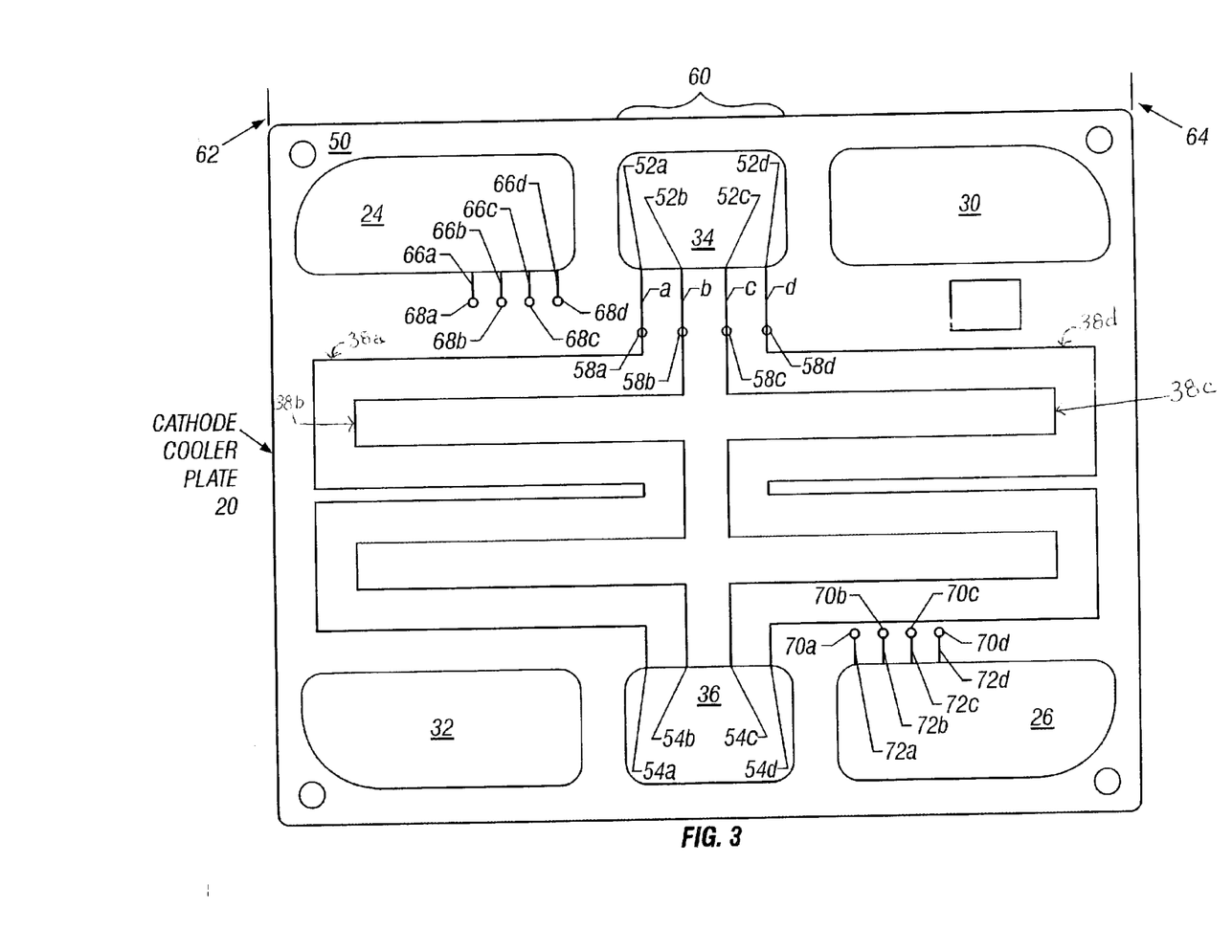
FIG. 3 shows a cooling surface of the cathode cooler plate of FIG. 1.
Figure 6C:
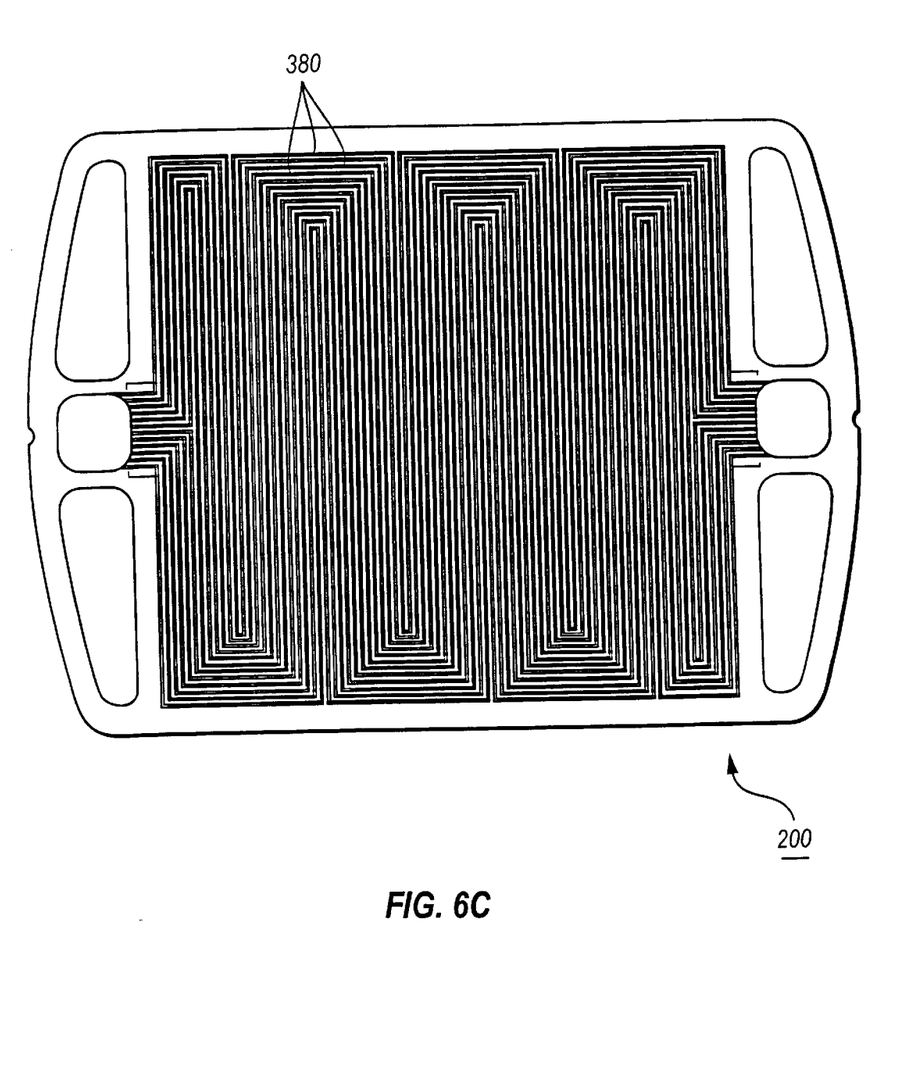
FIG. 6C, shows a cooling surface of a cathode cooler plate for the different design.

As shown in FIG. 3, cathode cooler plate 20 has a cooling surface 50 with multiple serpentine coolant channels 38a, 38b, 38c, 38d. During operation, the serpentine coolant channels 38a, 38b, 38c, 38d, allow coolant air to flow from the coolant intake opening 34 to the coolant outlet opening 36. Although a typical cooler plate would have many coolant channels as shown in FIG. 6C, only four of the coolant channels are shown in FIG. 3. Each coolant channel 38a, 38b, 38c, 38d begins at a point 52a, 52b, 52c, and 52d on the coolant intake opening manifold and ends at a point 54a, 54b, 54c, 54d on the coolant outlet manifold. The coolant channels 38a, 38b, 38c, 38d weave back and forth over the cooling surface 50 in a serpentine fashion as much of the plate to the coolant air. Water inlet ports 58a, 58b, 58c, 58d are positioned near the beginning 52a, 52b, 52c, and 52d of the coolant channels 38a, 38b, 38c, 38d to introduce water to the coolant air in the coolant channels 38a, 38b, 38c, 38d. The system for introducing water into the cooling channels will be described in greater detail below with reference to FIG. 4. As the hydrated coolant air flows along the coolant channels 38a, 38b, 38c, 38d, it absorbs heat from the cathode cooler plate 20 and the temperature of the coolant air rises. The temperature of the coolant air rises to the operating temperature of the fuel cell. The warm, hydrated coolant air flows out of coolant outlet manifold 36, taking the absorbed heat with it and cooling plate 20.

The cooling surface of the anode cooler plate 16, which is pressed against the cooling surface 50 of the cathode cooler plate 20 in the fuel cell stack 10, is similar to the cooling surface 50 of the cathode cooler plate 20 and has cooling channels which are matched to the cooling channels 38 of the cathode cooler plate. However, the anode cooler plate 16 does not have water inlet ports 58a, 58b, 58c, 58d.

As previously described with reference to FIG. 2, the endplate assembly 11 directs the hydrated coolant air from the coolant outlet manifold 36 to the cathode intake manifold 24. The hydrated air flows from the cathode intake manifold 24 along cathode intake connector channels 66a, 66b, 66c, 66d on the cooling surface 50 and through the intake passthroughs 68a, 68b, 68c, 68d to cathode channels 28 on the reactant surface 27 of the cathode cooler plate 20.

Figure 4:
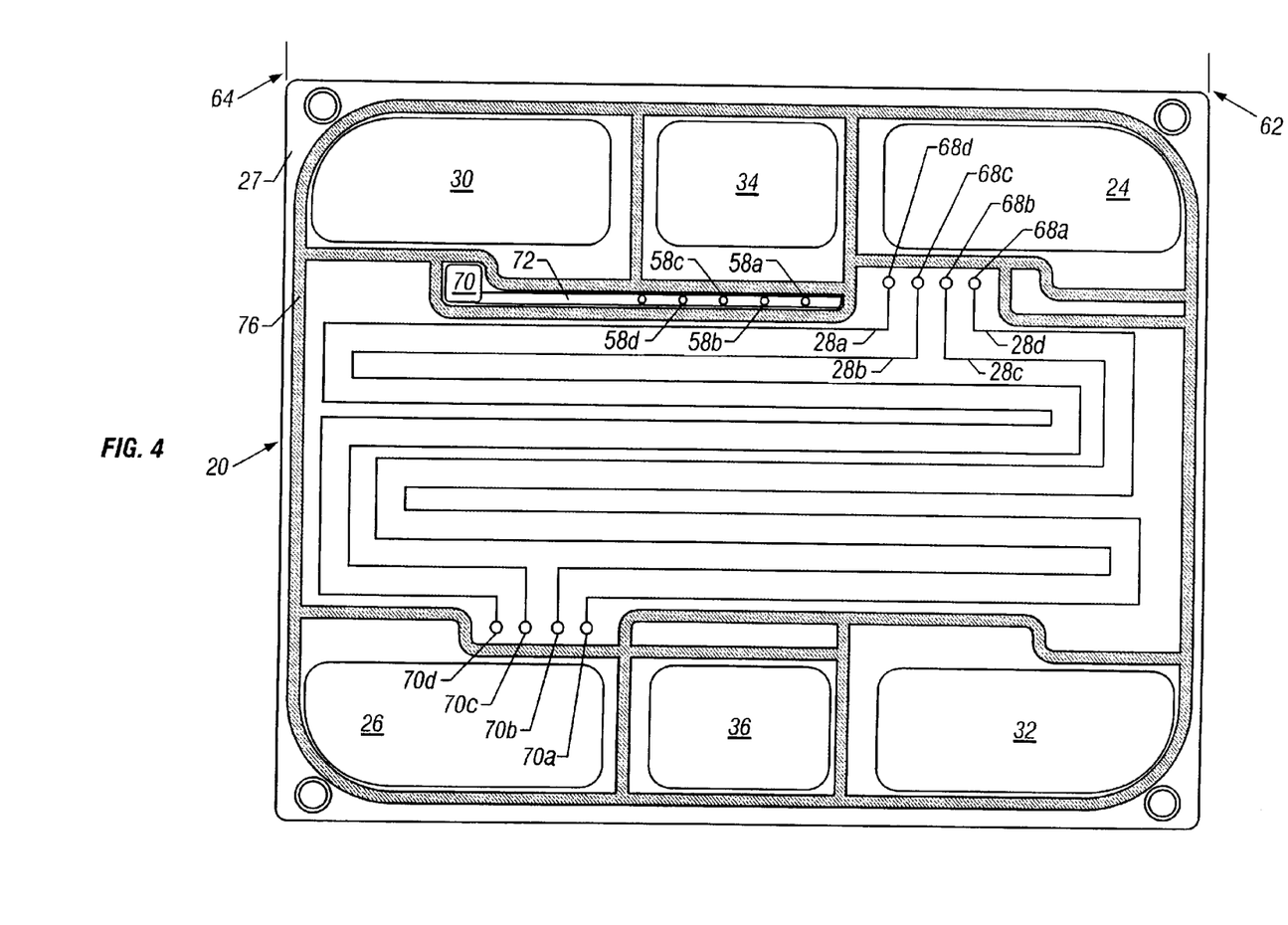
FIG. 4 shows a reactant surface of the cathode cooler plate of FIG. 1.

As shown in FIG. 4, reactant surface 27 of cathode cooling plate 20 has cathode channels 28a, 28b, 28c, 28d which receive cathode air from cathode air inlet ports 68a, 68b, 68c, 68d. The cathode channels 28a, 28b, 28c, 28d are open faced so as to expose the cathode air to the membrane electrode assembly. Cathode channels 28a, 28b, 28c, 28d weave back and forth over reactant surface 27 so as to expose the maximum area of the membrane electrode assembly 18 (FIG. 1) to the cathode air. The other end of the cathode channels 28a, 28b, 28c, 28d are connected to outlet passthroughs 70a, 70b, 70c, 70d.

Referring again to FIG. 3, outlet passthroughs 70a, 70b, 70c, 70d allow cathode air to flow from the cathode channels 28 on the reactant surface 27 of cathode plate 28 to cathode outlet connectors channels 72a, 72b, 72c, 72d. The cathode air flows from the channels 72a, 72b, 72c, 72d to the cathode outlet port 26, which allows the cathode air to flow out of the fuel cell through the cathode outlet manifold.

Referring again to FIG. 4, each of the anode cooler plate 16 and the cathode cooler plate 20 has a water intake opening 70 which when aligned with similar openings in other plates defines a water manifold for the fuel cell stack 10. A water channel 72 allows water to flow from the water intake opening 70 to water inlet ports 58a, 58b, 58c, 58d. The water inlet ports 58a, 58b, 58c, 58d run from the reactant side 27 of the cathode cooler plate 20 to the cooling side 50 of the cathode cooler plate 16. As shown in FIG. 3, the inlet ports 58a, 58b, 58c, 58d are aligned with the cooling channels 56a, 56b, 56c, 56d to allow water to flow from the water channel 72 to the cooling channels 56a, 56b, 56c, 56d through the inlet ports 58a, 58b, 58c, 58d. When the fuel cell stack 10 is in use, a pump (not shown) delivers water to the water manifold 70 at a pressure that is higher than the pressure of the gasses in the channel 72. The water manifold typically introduces the water at a pressure between 1 and 5 psi. The water flows along channel 72, through water inlet ports 58a, 58b, 58c, 58d, and into coolant channels 38a, 38b, 38c, 38d.

Cathode reactant surface 27 has a gasket groove 76 that receives the membrane gasket 44. The groove 76 improves the seal provided by the gasket, thereby preventing fluids from escaping from the fuel cell stack 10.

The reactant surface of the anode cooler plate 16 is similar to the reactant surface 27 of the cathode cooler plate 20 but does not have the water channel, the water inlet ports, or the gasket groove. The anode cooler plate 16 has anode channels that are a mirror image of the cathode channels 28 of the cathode cooler plate 20.

Figure 5:
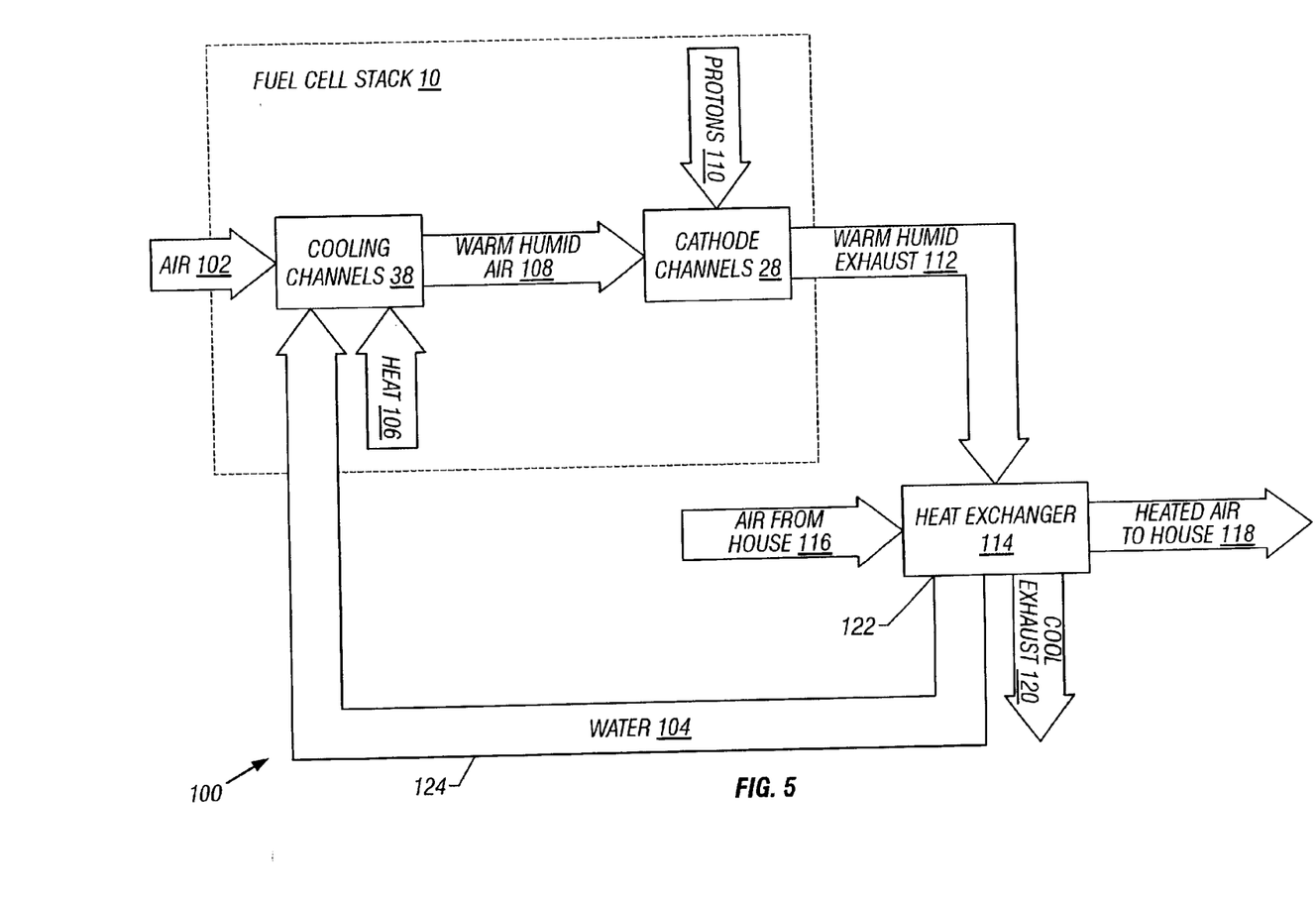
FIG. 5 is a block diagram of a system that uses exhaust gases from the fuel cell stack of FIG. 1 to heat a residence.

As shown in FIG. 5, fuel cell stack 10 provides heat to a system 100 for heating air in a residence. As previously described, air stream 102 flows into cooling channels 38 where water 104 is introduced to the air stream 102. Air stream 102 and water 104 absorb heat 106 that is generated by the reactions in the fuel cell stack 10. Heat 106 causes water 104 to vaporize and mix with the air stream 102, producing a warm humid air stream 108. Humid air stream 108 contains oxygen, steam and other gases, such as nitrogen, that are typically present in air. Humid air stream 108 flows through cathode channels 28, where oxygen contained in the air reacts with protons 110 from membrane electrode assembly 18 (FIG. 1). The reaction generates electrical energy and water. The generated water further humidifies unreacted gases in the humid air stream 108 to produce a warm, humid, exhaust stream 112. Exhaust stream 112 flows to a cathode heat exchanger 114, such as a fin and tube heat exchanger, which transfers heat from the exhaust stream 112 to an air stream 116 from the residence. The heated air stream 118 is returned to the residence, thereby warming the interior of the residence.

Cathode heat exchanger 114 cools the exhaust stream 112 causing moisture contained within exhaust stream 112 to condense into water 104. The system 100 includes a water conduit 124, which connects a drain 122 in the heat exchanger to cooling channels 3. The condensed water 104 flows out of the drain 122 through the water conduit 124 and is re-injected into the cooling channels 38. The conduit 124 provides enough water 104 to hydrate the air 102 in the cooling channels 38.

An anode heat exchanger, which is similar to cathode heat exchanger 114, transfers heat from anode exhaust gases from the anode channels to water for the hot water system of the residence.

Although one particular embodiment of the invention has been described, it will be understood that various modifications may be made without departing from the spirit and scope of the invention. Other embodiments may introduce water to coolant air in the cooling channels through water inlet ports that are positioned on the anode plate instead of the cathode plate. Alternatively, other embodiments my have water inlet ports on both the anode and the cathode plate.

Accordingly, other embodiments are within the scope of the following claims.

What is claimed is:

1. A method comprising:

introducing a coolant gas into a channel defined within a fuel cell stack;

introducing water into the channel, the water hydrating the coolant gas to produce a hydrated gas;

allowing the hydrated gas to flow along the channel to an outlet port, the hydrated gas absorbing heat from the stack as the hydrated gas flows along the channel; and allowing the hydrated gas to escape from the outlet port and thereby causing heat to flow from the fuel cell stack;

directing the hydrated gas to a reactive surface of the fuel cell; and reacting the hydrated gas to generate electricity.

2. The method of claim 1 wherein said reaction produces a hydrated exhaust stream, the method further comprising:

condensing water from the hydrated exhaust stream by transferring heat from the hydrated exhaust stream; and introducing the condensed water into the channel to hydrate the coolant gas.

3. The method of claim 3 wherein heat is transferred from the hydrated exhaust system to residential heating system.

4. The method of claim 3 wherein heat is transferred from the hydrated exhaust system to at least one of water and air.

5. A method comprising:

introducing a coolant gas into a channel defined within a fuel cell stack;

introducing water into the channel, the water hydrating the coolant gas to produce a hydrated gas;

allowing the hydrated gas to flow along the channel to an outlet port, the hydrated gas absorbing heat from the stack as the hydrated gas flows along the channel; and allowing the hydrated gas to escape from the outlet port and thereby causing heat to flow from the fuel cell stack, wherein the water is introduced at a pressure between 1 and 5 pounds per square inch.

6. The method of claim 5 further comprising directing the hydrated gas to a reactive surface of the fuel cell.

* * * * *